United States Patent
Isaacs

[15] 3,698,733
[45] Oct. 17, 1972

[54] FREE STANDING FOLDABLE CART

[72] Inventor: Harold Isaacs, 2583 Fenwick Road, University Hts., Ohio 44118

[22] Filed: April 22, 1971

[21] Appl. No.: 136,350

[52] U.S. Cl. ...................... 280/33.99 T, 220/97
[51] Int. Cl. ................................. B60p 9/00
[58] Field of Search ................... 280/33.99 T

[56] References Cited

UNITED STATES PATENTS

| | | |
|---|---|---|
| 2,756,894 | 7/1956 | Phillips..........280/33.99 T UX |
| 2,827,302 | 3/1958 | Skyrud................280/33.99 T |
| 3,523,694 | 8/1970 | Oliver.................280/33.99 T |

FOREIGN PATENTS OR APPLICATIONS

| | | |
|---|---|---|
| 233,970 | 6/1964 | Austria................280/33.99 T |
| 727,568 | 4/1955 | Great Britain ......280/33.99 T |

*Primary Examiner*—Leo Friaglia
*Attorney*—Edward E. Sachs

[57] ABSTRACT

A free standing foldable cart having a rectangular base shelf with a post in each of the four corners and a pair of longitudinally spaced end frames. The posts of each end frame are pivotally connected to a corresponding post of the base shelf for rotation of each end frame about a single axis of rotation to fold the end frames about the base shelf. In the folded position, two or more carts may be vertically stacked upon and moved about the running gear of the bottom cart.

14 Claims, 9 Drawing Figures

INVENTOR
HAROLD ISAACS
BY
*Edward E. Sachs*
ATTORNEY

PATENTED OCT 17 1972　　　　　　　　　　　　　　　3,698,733

INVENTOR
HAROLD ISAACS
BY
Edward E. Sachs
ATTORNEY

FREE STANDING FOLDABLE CART

This invention relates generally to a movable cart used in warehouses and in the food distribution industry in which the end frames can be folded over a horizontal base shelf which is movable on four wheels. Several folded carts of this type can be vertically stacked together.

In recent times it has become desirable, particularly in the food distribution industry, to improve the movement of the merchandise from warehouses via truck trailer to retail outlets. Use has been made of movable carts, usually of the four-wheel type. These carts are loaded with merchandise and rolled onto a trailer by means of suitable lifting or docking devices, and the merchandise is unloaded from the trailer by moving the merchandise on the carts directly to the point of destination. It has been found desirable to simplify the return of the carts by reducing the number of trips required to the original loading station. For this purpose it has been suggested to fold or "knock down" the carts so that a great number of carts can be simultaneously returned. For instance, the end frame of the carts is "knocked down" and placed on or alongside the base shelf and other carts, or parts thereof, are placed along or upon the structures of the first mentioned cart. Other known carts are folded in a vertical plane, which necessitates numerous hinging points and removes the stability required for self-supporting the cart. With such carts, it is frequently necessary to lean the carts against the wall or other supports. Moreover, these carts must be moved individually to the trailer.

It is, therefore, the primary objective of the present invention to provide a four-wheel cart which is free standing, or self-supporting, in folded, as well as in the unfolded position.

It is a further object of the present invention to provide a cart of the type described above in which the number of hinging points for folding the end frames are substantially reduced in order to simplify the structure and shorten the fold-down operation and which is adapted to be stacked vertically with other like carts which can be moved together on the four wheels of the bottom cart.

It is another object of the present invention to provide a cart which can be folded so that the carts can be vertically stacked to occupy a fraction of the floor space and volume of a trailer truck to enable a more rational use of truck-trailer facilities.

It is still another object of the present invention to provide a foldable cart in which foldable frame members are placed under a load to provide rigid, stiff structural integrity.

It is a still further object of the present invention to provide a cart in which the position of the wheels in the folded position of the cart is not changed relative to the base shelf.

An aspect of the present invention resides in the provision of a free standing foldable cart having a generally rectangular shaped base, supported on four wheels, providing a horizontally arranged shelf and including vertically disposed posts affixed to the base shelf at each of its four corners. A pair of rectangular shaped end frames each having two posts which are secured together in parallel spaced relation are provided with the end frames being proportioned in such a manner so that each frame post extends in parallel and closely overlapping relationship to one shelf post. Means, such as a pin, is provided for pivotably mounting the overlapping posts mentioned above to each other to establish for each end frame an axis of rotation perpendicular to the longitudinal axis of the base shelf, with one axis of rotation of one end frame being spaced vertically higher than the other relative to the horizontal position of the base shelf. A releasable locking member engages one end frame for maintaining the end frame in a vertical, unfolded position.

For a better understanding of the present invention, together with other and further objects thereof, reference is had to the following description taken in connection with the accompanying drawings, and its scope will be pointed out in the appended claims.

Figure 1:
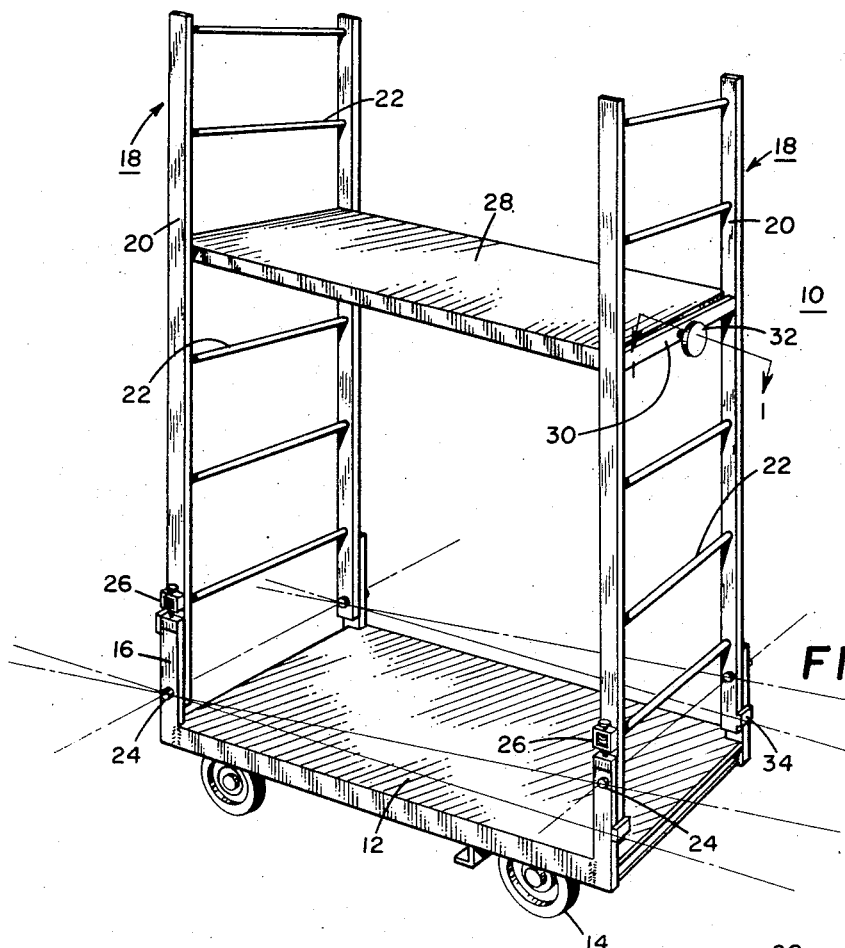
FIG. 1 is a perspective view of a cart in accordance with the present invention.

Referring now to the drawings, there is shown a cart 10 having a generally rectangular shaped base shelf 12, provided on its bottom surface with four spaced wheels 14 to support the shelf. The base shelf 12 is horizontally arranged and rigidly affixed to each of the four corners is a stationary base post 16. The four base posts 16 extend vertically in parallel relationship and are generally of the same height.

A pair of rectangularly shaped end frames 18 each having two spaced apart frame posts 20 are secured in parallel relationship by means of rungs 22. The end frames 18 are normally, i.e. in unfolded position vertically arranged with the frame posts 20 being proportioned so that each frame post 20 extends parallel and in closely overlapping relationship to a post 16 to facilitate a pivotable connection between the end frame 18 and the base posts 16. A pin 24 extends axially, i.e. transversely to the length of the posts, through the posts to establish for each end frame 18 an axis of rotation which is perpendicular to the longitudinal axis of the base shelf 12. Referring particularly to FIG. 1, it is to be noted that in order to facilitate the folding of the end frames, the axis of rotation, i.e. the location of the pin 24 for one end frame is vertically spaced higher relative to the location of the other pin 24 and to the horizontal position of the base shelf 12.

Figure 2:
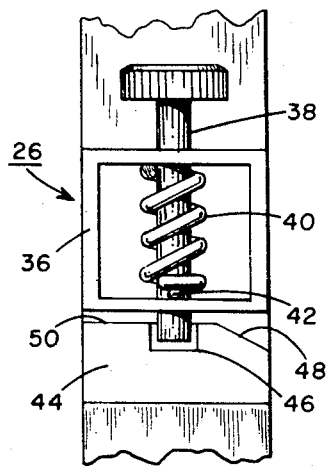
FIG. 2 is a fragmentary vertical side view illustrating the latch system.
Figure 3:
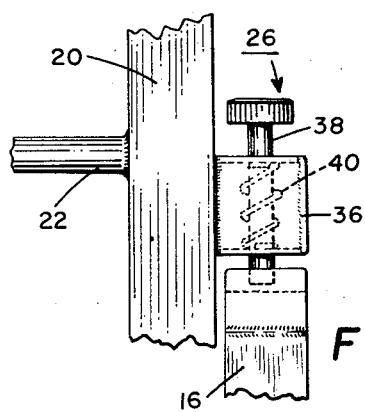
FIG. 3 is an end view of the latch system shown in FIG. 2.
Figure 6:
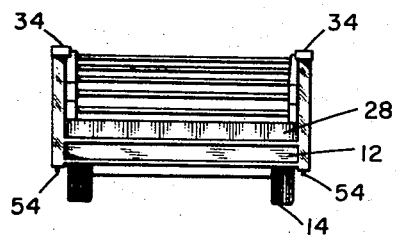
FIGS. 6 and 7 are opposite end views of the cart shown in FIG. 5.

As the generic term is used herein, the releasable locking member denotes both, or either, a latching or a latch system 26, see FIGS. 2 and 3 and an upper shelf 28.

Figure 1A:
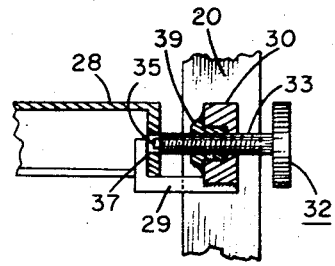
FIG. 1a is an enlarged sectional view taken along line 1—1 of FIG. 1.

The upper shelf 28 is removably placed upon four L-shaped supports 29, see FIG. 1a, extending in a set of two from each horizontal member 30 arranged between the vertical posts 20 of each end frame. One such horizontal member 30 has an opening provided with a stationary nut 39 to receive therethrough a locking screw 32 having a threaded stem 33. The stem terminates with a narrowed end 35 bearing upon the shelf 28 to establish compression and tension between the upper shelf 28 and the end frames 18 thereby permitting a predetermined spacial relationship between the two end frames. An opening 37 in the vertical surface of shelf 28 serves as a guide to receive the narrowed end 35 of screw 32. Between the other end frame 18 and the opposite end of the shelf 28 there is placed a guide pin (not shown), secured on the horizontal member 30 which aligns the end frame with the shelf 28 with the proper position of the shelf 28 by means of a guide opening in the shelf 28, not shown. The locking screw 32 can be adjusted to effect the required degree of compression between the cooperate members as above mentioned. Each frame post 20 is provided with an abutment member or stopper 34 which abuts each base post 16 of the end frames 18. These stoppers 34 prevent a rotary movement of the end frames in the undesired direction. The stoppers 34 on one end frame are spaced vertically higher relative to the stoppers on the other end frame, i.e. in a relation inverse to that of the location of pins 24 so that the stoppers are below the elevated pins 24 and above the pins located closer to the end of the posts. The cart in accordance with this invention requires a total of not more than four hinging points with each two hinging points being coaxial and, as already noted, such axes being at vertically spaced elevations.

The latch system 26 provides a positive control over the rotational movement of the end frames 18. As shown in FIG. 1, each end frame is provided with a latch system 26. In order for the latch system 26 to establish a releasable locking means there is affixed, integrally, on a corner post 20, a hollow, open-faced, generally square shaped latch housing 36. The housing is apertured to receive transversely therethrough a cylindrical latch pin 38 which, within the latch housing 36, is surrounded by a compressive spring 40 which acts at its upper end against the wall of the latch housing and reacts against a roll pin 42 secured to extend radially outward from the pin 38. Accordingly, the pin 38 is under a constant bias in a downward direction, as shown in FIGS. 2 and 3.

A complementary striker member 44 is rigidly secured on base post 16, in a location adjacent to the latch housing 36 and is provided with a striker slot 46 adapted for receiving therein an end of latch pin 38 protruding beyond the latch housing 36. The latch pin 38 is free to rotate which obviates the need for any particular orientation thereof. The striker member 44 has a surface which, in part, is sloped, see 48, to facilitate the interaction between the striker member and the pin. The remainder of the surface of member 44, see 50, is flat to provide a support for carts which can be vertically stacked above a bottom cart. Upon rotation of the end frame member 18, the latch pin 38 abuts the sloped surface 48, which causes the pin to be moved towards the latch housing 36 until the pin is permitted to enter into the striker slot thereby preventing movement between the stationary post 16 and the rotatable post 20. The pin 38 can be manually lifted against the force of spring 40 to move the pin out of slot 46 to release the locking condition.

Figure 4:
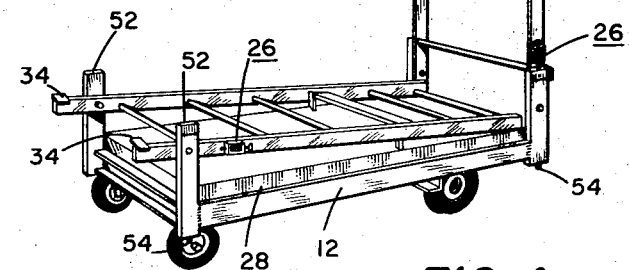
FIG. 4 is a perspective view of the cart shown in FIG. 1, illustrating a partially folded condition.
Figure 5:
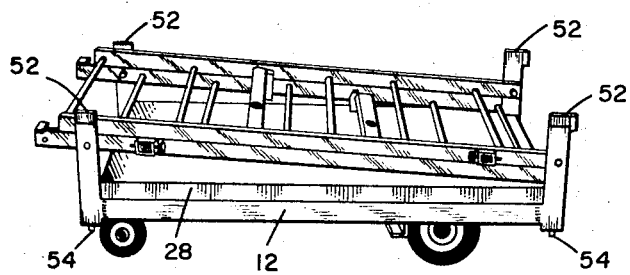
FIG. 5 is a view similar to FIG. 4 showing the cart completely folded.
Figure 7:
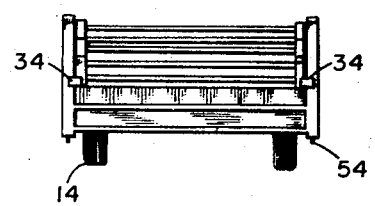
Figure 8:
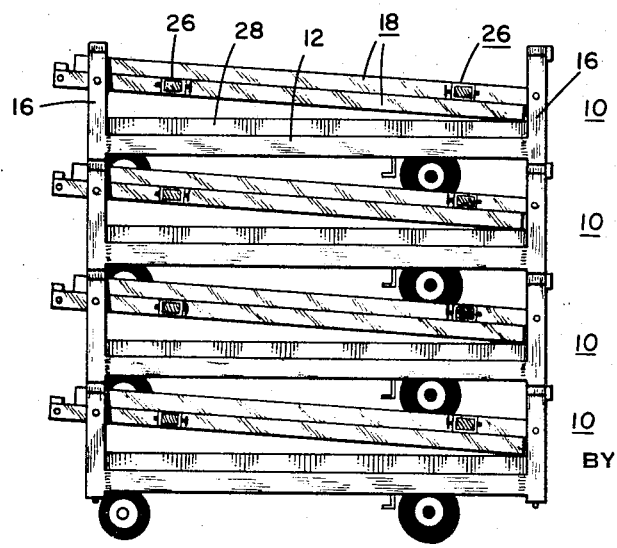
FIG. 8 is a side view of a plurality of folded and vertically stacked carts in accordance with the present invention.

In order to fold the cart 10, the upper shelf 28 is removed by unscrewing the compressing screw 32 and thereafter by lifting off the shelf 28. The shelf 28 is then placed upon the base shelf in the inverted position 12 and thereafter the latch pin 38 is raised out of the striker slot 46 to permit rotational movement of the end frame. The end frame having a relatively higher hinge point is folded first in a manner so that in the final folded position the end frame lies co-extensive with the base shelf 12. The other end frame 18 is then folded about its axis of rotation, as exemplified by pin 24, to a position substantially co-planar to the first folded end frame. In this parallel position of the two end frames, the two end frames are angularly related to the plane of the surface of the base shelf 12. The end of the first folded end frame 18 bears upon the base shelf and, more specifically, rests upon the upper shelf 28, as shown in FIGS. 4, 5 and 8. Once the cart 10 has been folded, it will be appreciated that the upper shelf 28 is in a locked position by virtue of the weight of the end frames and its bearing relationship thereto.

Referring now more specifically to FIG. 5, the folded cart now freely exposes the upper end of the posts 16, each of which is provided with an aperture 52 to receive therein a guide pin 54 located at the opposite and bottom end of each post 16. Therefore, upon completion of the folding operation, a second folded cart may be lifted upon another folded cart with the posts 16 of each cart being brought to mechanical juxtaposition so that the guide pins 54 can enter into apertures 52 to rigidly connect the two carts and to prevent any significant relative movement therebetween. This process can be repeated a number of times as is illustrated in FIG. 8 which shows four carts vertically stacked upon each other. The unitary stack of carts, as shown in FIG. 8, can then be moved by solely using the running gear of the bottom cart. Unloading and unfolding of carts may proceed in exactly the reverse order from that described above.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A free standing foldable cart, comprising: a generally rectangular shaped base, supported on four wheels, providing a horizontally disposed shelf, and vertically disposed posts affixed to said base at each of its four corners;

a pair of rectangular shaped end frames each having two posts which are secured together in parallel spaced relation, the end frames being proportioned so that each frame post extends in parallel and closely overlapping relationship to one shelf post;

means for pivotably mounting the overlapping posts to each other to establish for each end frame an axis of rotation perpendicular to the longitudinal axis of the base shelf, with one axis of rotation being vertically spaced higher than the other relative to the horizontal position of said base shelf; both of said end frames being of such length as to be foldable about their respective axis of rotation and to a final folded position substantially co-extensive with said base shelf and substantially coplanar to each other as well as angularly related to the plane of the surface of the base shelf;

and releasable locking means on each end frame engaging a corresponding base post for maintaining said end frames in a vertical position relative to the base shelf.

2. A free standing foldable cart according to claim 1, wherein said releasable locking means is composed of a striker on the base post and a latch pin supported on one rotatable frame to releasably engage an aperture on the base post.

3. A free standing foldable cart according to claim 2, wherein said striker is integrally connected to a base corner post adjacent to said latch pin.

4. A free standing foldable cart according to claim 2, wherein said latch pin is cylindrical and said striker has a tapered surface and a flat support surface.

5. A free standing foldable cart according to claim 1, wherein each end frame is foldable over not move than a single axis of rotation.

6. A free standing foldable cart according to claim 1, wherein the foldable end frames include a total of not more than four hinging points.

7. A free standing foldable cart according to claim 1, wherein one axial end of one end frame bears upon and is supported by said base shelf.

8. A free standing foldable cart according to claim 1, wherein one end frame is axially shorter than the overall length of the cart.

9. A free standing foldable cart according to claim 1, including an upper shelf releasably secured between said end frames vertically above and coplanar with said base shelf.

10. A free standing foldable cart according to claim 9, and adjustable compression means in engagement with and between said upper shelf and an end frame.

11. A free standing foldable cart according to claim 10, wherein said adjustable compression means comprises a threaded member extending through a portion of said end frame and disposed in bearing relation to said upper shelf.

12. A free standing foldable cart according to claim 11, wherein said end frame includes a horizontally extending member for threadedly receiving said threaded member; and a hook-like member rigidly secured to said horizontal member and adapted for abutting portions of said upper shelf.

13. A free standing foldable cart according to claim 1, wherein the respective upper and lower ends of two or more corner posts are each provided with male and female mating parts to rigidly mount another like cart in superposed relation thereto by interengagement of the corresponding mating elements on the respective vertically aligned corner posts.

14. The combination of a plurality of vertically stacked folded carts, each cart comprising: a generally rectangularly shaped base, supported on four wheels, providing a horizontally disposed shelf, and vertically disposed posts affixed to said base at each of its four corners;

a pair of rectangularly shaped end frames each having two posts which are secured together in parallel spaced relation, the frames being proportioned so that each frame post extends in parallel and closely overlapping relationships to one shelf post;

means for pivotably mounting the overlapping posts to each other to establish for each end frame an axis of rotation perpendicular to the longitudinal axis of the base shelf wherein both of said end frames are foldable about their respective axis to a final folded inoperative position over the base shelf to permit stacking, and locking means on each end frame for engaging a mating member on the upper end of two or more corner posts for maintaining said end frames in a vertical operative position relative to the base shelf, the lower ends of said two or more corner posts each provided with a member effective to mate with said mating member on the corresponding upper end of the respective corner post for stacking said carts with the respective corner posts in vertically aligned position one above the other.

* * * * *